C. L. CUNNINGHAM.
TIRE.
APPLICATION FILED JAN. 22, 1919.

1,353,726.

Patented Sept. 21, 1920.
2 SHEETS—SHEET 1.

Witnesses

Inventor
C. L. Cunningham
By Victor J. Evans
Attorney

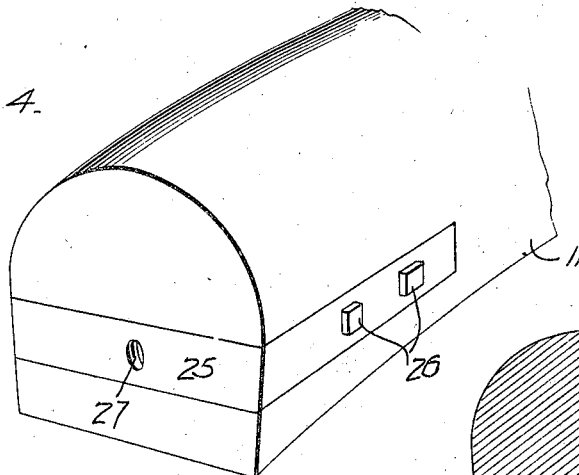
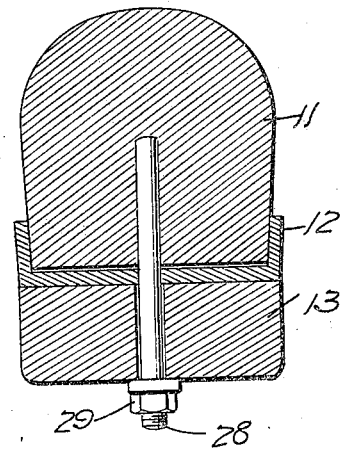
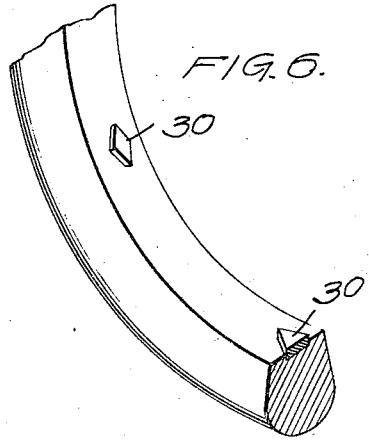
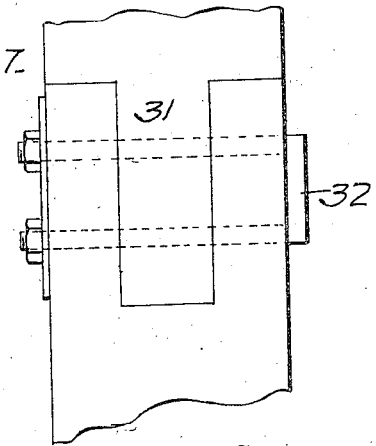

UNITED STATES PATENT OFFICE.

CLYDE L. CUNNINGHAM, OF PERRIS, CALIFORNIA.

TIRE.

1,353,726.　　　　　Specification of Letters Patent.　　Patented Sept. 21, 1920.

Application filed January 22, 1919. Serial No. 272,494.

*To all whom it may concern:*

Be it known that I, CLYDE L. CUNNINGHAM, a citizen of the United States, residing at Perris, in the county of Riverside and State of California, have invented new and useful Improvements in Tires, of which the following is a specification.

This invention relates to vehicle tires, the object being to provide a solid tire which may be clearly secured to the rim of a wheel for use as an emergency tire. Another object is to provide a tire of this character which will be always ready for use, so that should the vehicle be equipped with pneumatic tires and a puncture, blow-out or other damage occur the solid tire may be quickly substituted for the purpose of saving damage to the rim and of maintaining the vehicle at its proper level.

A further object of the invention is to provide novel means for securing the tire upon the rim in a manner to prevent relative movement or objectionable noise due to play between the parts, the tire being solidly and positively clamped in position.

A still further object is the provision of a tire of cheap, simple and durable construction, which will take the place of the spare tire usually carried by vehicles.

Other objects and advantages of the invention will appear as the following description is read in connection with the accompanying drawings.

In the drawings:

Fig. 4 is a similar view of the adjacent end of the other section.

Fig. 5 is an enlarged sectional view on the line 5—5 of Fig. 1.

Fig. 6 is a fragmental perspective view looking at the inner side of the tire and showing the cushion means carried thereby.

Fig. 7 is an enlarged plan view of a portion of a tire illustrating a modified form of connection.

Referring to the drawings in detail like characters of reference will denote corresponding parts throughout the several views.

Figure 1:
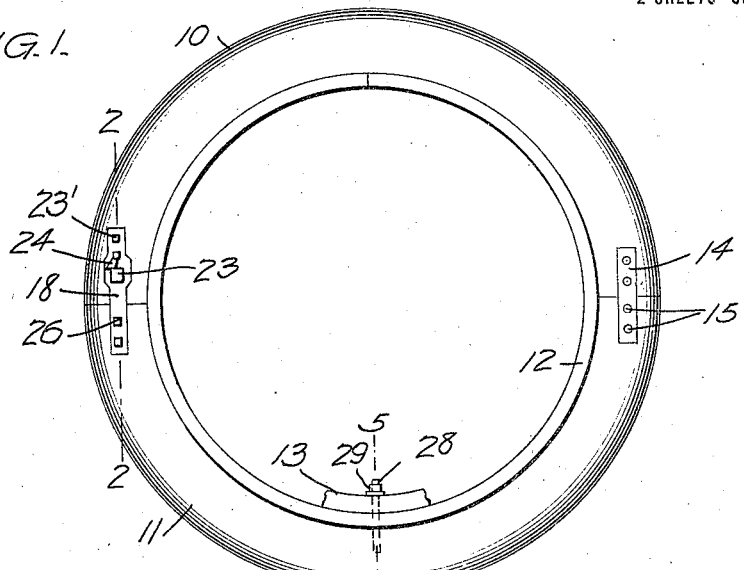
Figure 1 is a side elevation of a tire embodying the present invention and shown upon the rim of a wheel.
Figure 2:
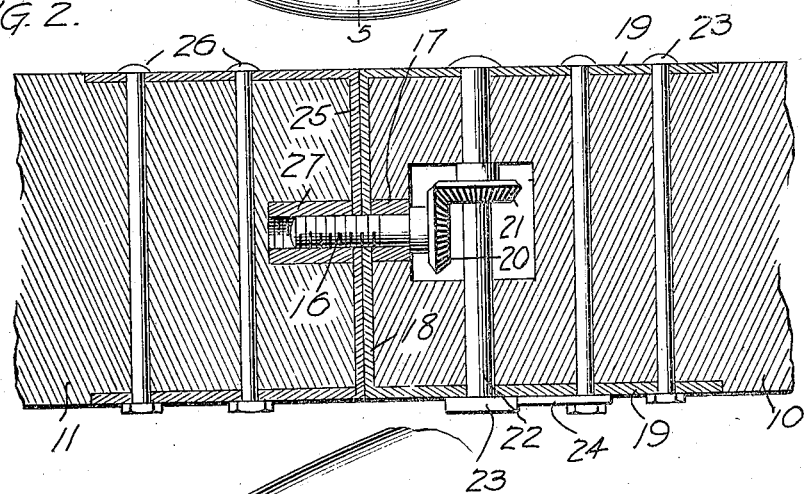
Fig. 2 is an enlarged sectional view on the line 2—2 of Fig. 1.
Figure 3:
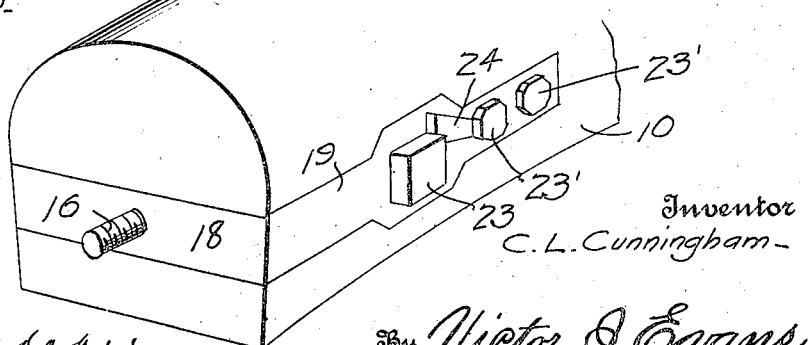
Fig. 3 is an enlarged fragmental perspective view of the end of one of the tire sections.

The tire shown in the accompanying drawings is preferably constructed of suitable wood, although it is, of course, understood that other material adapted for the purpose may be used. The tire is made in sections, preferably two in number, and these sections are indicated by numerals 10 and 11. Novel means are provided for securing the sections together upon the rim 12 of a wheel 13. The rim may be of any of the various types now in use.

The tire is diametrically divided and the adjacent ends upon one side of the wheel being secured by means of counter sunk plates 14, which are bolted or otherwise secured as at 15, that is plates forming a connecting bar which extend across the ends of the sections and upon opposite sides of the tire.

The adjacent ends upon the opposite side of the wheel, that is, at a point diametrically opposite the plates 14 are clamped or secured together by means of mechanism which enables the tire to be tightly and securely clamped upon the rim. This mechanism includes a threaded bolt 16, which is disposed circumferentially of the tire and extends outward beyond the end of the tire section 10, passing through a sleeve 17 embedded within the tire. This sleeve is secured to and extends inwardly from a U shaped plate 18, which latter extends across the end of the section 10 and for an appreciable distance along both sides of the section, as shown at 19. The inner end of the threaded shaft 16 has secured thereon a beveled pinion 20, which engages a similar pinion 21 mounted upon a transverse shaft 22. This last mentioned shaft has bearings in the sides 19 of the U shaped plate, one end of the shaft extending slightly and being provided with a rectangular extremity 23 for engagement with a wrench or other tool to provide for the rotation of the shaft. When rotated the shaft 22 will, through the pinions 20 and 21 rotate the threaded shaft 16. The plate 18 is seated within a recess in the end of the section 10 and is flushed with the outer surface of the said section, the said plate being held in place by means of the transversely extending bolts 23. Mounted upon one of these bolts is a dog 24 which is adapted to engage the squared extremity 23 of the shaft 22 to prevent accidental rotation of the latter.

The adjacent end of the section 11 is also provided with a U shaped plate 25, and like the plate 18 is flushed with the surface of the section and is held in position by means of bolts 26. Extending inwardly from the end of the plate 25 is a threaded sleeve 27 which is adapted to receive the threaded end of the shaft 16 when the sections are brought together, so that a rotation of the shaft 22 will cause the threaded shaft 16 to draw the ends of the sections 10 and 11 tightly together and upon the rim 12.

To further hold the tire in position and to prevent creeping the section 11 has projecting radially therefrom, a bolt 28. This bolt is adapted to pass through the valve opening in the rim and felly of the wheel, and to receive a nut 29. The inner surface of the sections 10 and 11 are provided at spaced intervals with cushioning members in the form of rubber plugs 30, and when in engagement with the perimeter of the rim, these rubber plugs will act to prevent relative movement between the rim and tire.

In Fig. 7 there is illustrated a modified form of means for securing the ends of the sections together, which consists of a mortise and tenon in the adjacent ends as shown at 31, and passing transversely therethrough a U bolt 32. Other changes may be in the form, proportions and minor details of construction, and the right is herein reserved to make such changes as properly fall within the scope of the claims hereto appended.

Having described the invention, what is claimed is:

1. A vehicle tire formed of separate sections, means for securing the sections together, said means including a threaded bolt embedded in the end of one section and engageable with a threaded socket embedded in the end of the adjacent section, means extended upon the outside of the tire for rotating the bolt, and means also located upon the outside of the tire and engageable with and disengageable from the bolt rotating means for holding the bolt against movement.

2. A vehicle tire formed of separate sections, means for securing the sections together, said means including a threaded bolt embedded in the end of one section and engageable with a threaded socket embedded in the end of the adjacent section, gearing located within the tire for rotating the bolt, a pivoted dog engageable with the gearing operating means for holding the bolt against movement.

3. A vehicle tire formed of separate solid sections, means for securing said sections together and upon the rim of a vehicle wheel, and spaced compressible blocks embedded in the tire and engaging the rim for preventing creeping of the tire.

In testimony whereof I affix my signature.

CLYDE L. CUNNINGHAM.